P. E. HOLT.
DRIVING SPROCKET WHEEL.
APPLICATION FILED DEC. 7, 1916.

1,258,606.

Patented Mar. 5, 1918.

WITNESSES:
Charles Pickles
J. H. Herring

INVENTOR
Pliny E. Holt.
BY Strong & Townsend
ATTORNEY

UNITED STATES PATENT OFFICE.

PLINY E. HOLT, OF STOCKTON, CALIFORNIA.

DRIVING SPROCKET-WHEEL.

1,258,606.  Specification of Letters Patent.  Patented Mar. 5, 1918.

Application filed December 7, 1916. Serial No. 135,645.

*To all whom it may concern:*

Be it known that I, PLINY E. HOLT, a citizen of the United States, residing at Stockton, in the county of San Joaquin and State of California, have invented new and useful Improvements in Driving Sprocket-Wheels, of which the following is a specification.

This invention relates to sprocket driving wheels for use particularly in connection with endless flexible track such as employed in self-laying track vehicles.

The object of this invention is to provide a novel and improved means in taking up the slack in a track, due to elongation or wear.

In vehicles of this type the endless tracks are made up of a series of articulated link sections, the pin teeth of which engage alternate teeth on the sprocket driving wheel, the length of each link corresponding usually to the peripheral length of two teeth. By making alternate depressions between the teeth of the sprocket wheel of one depth and the intermediate depressions of a different depth and adjusting the chain so that its pin teeth enter the deeper depressions at the outset, provision is made whereby slack can be taken up in the chain as the latter wears and becomes stretched, simply by shifting the chain on the sprocket wheel so that the pin teeth of the chain enter the shallower depressions.

One form which my invention may assume is exemplified in the following description and illustrated in the accompanying drawing, in which.

Figure 1:
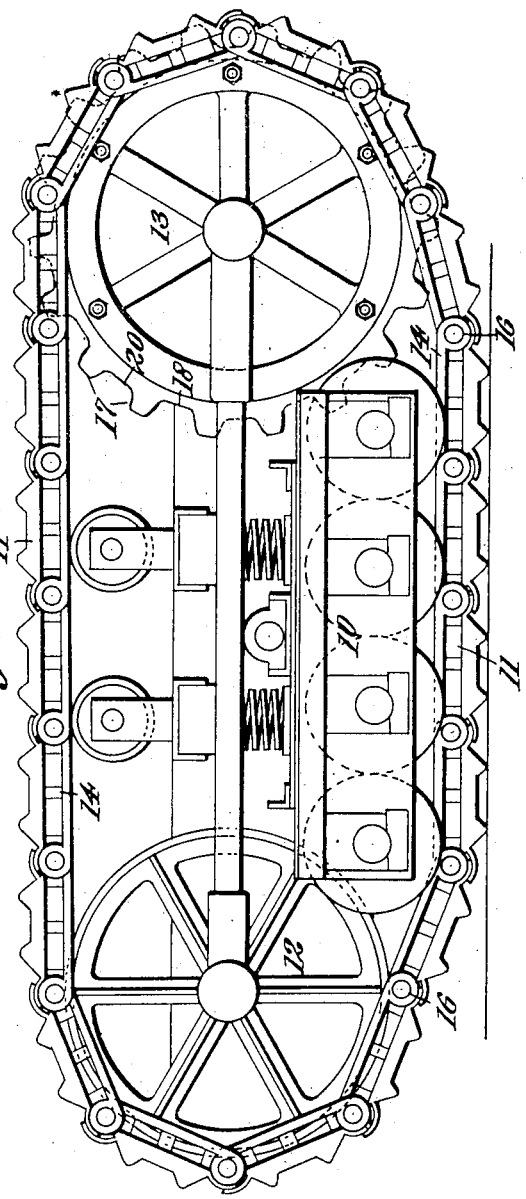
Figure 1 shows a side elevation on a tractor truck mechanism of the self-laying track type, embodying my invention.
Figure 3:
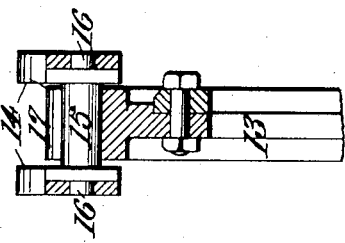
Fig. 3 shows a sectional view taken on a line of 3—3 of Fig. 2.

In the drawing I show a roller truck mechanism (10) within a self-laying track (11), the latter running over a front blank idler wheel (12) and a rear driving sprocket wheel (13). The track is made up of a series of articulated link sections, each comprising side bars (14), connected together at one end by gudgeon blocks, or sleeves, (15), and receiving journal pins (16) for connecting adjacent links together.

Teeth (17) are provided for the driving sprocket wheel, each having a low base (18) at one side, and pitch diameter of which is represented by the dotted lines (19), and a high base (20) at the other side, the pitch diameter of which is represented by dotted lines (21). Thus a sprocket wheel with various diameters is provided.

Figure 2:
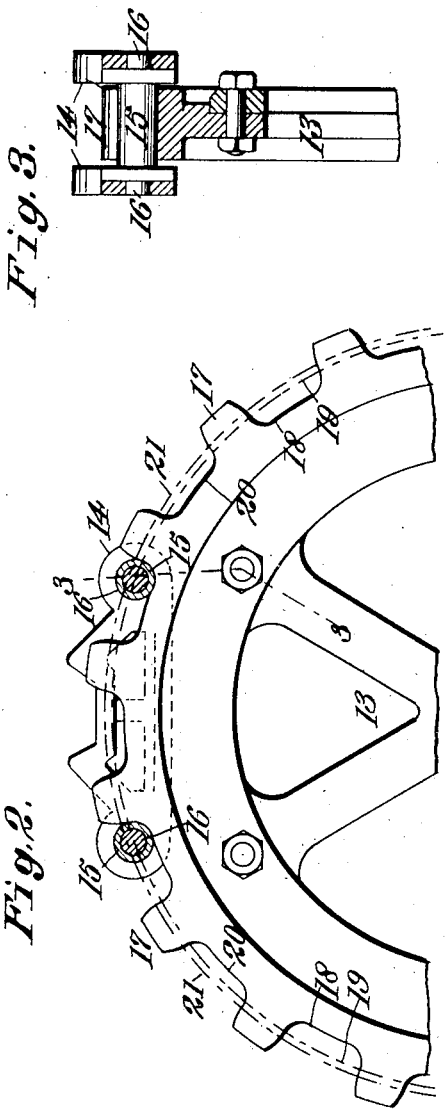
Fig. 2 shows a detailed view of the driving sprocket wheel with a link in place thereon, as employed in my invention.

The links of the track chain are so proportioned relatively to the teeth of the sprocket wheel that each link receives two teeth, and as assembled and operated the gudgeon blocks (15) (which constitute the pin teeth of the chain) are arranged to engage the teeth of the sprocket wheel at the lower base (18), as shown in Fig. 2. This is when the chain is new and unstretched; thereafter, as the teeth of the sprocket wheel wear and the chain becomes stretched, resulting in a great deal of slack in the chain, the latter is shifted relatively to the sprocket wheel so that the gudgeon blocks (15) engage in higher bases (20) of the teeth. This will cause a tightening of the chain to the extent of the difference in diameter of the pitch lines (19) and (21), and also provides a new wearing surface for the gudgeon blocks (15) to work against.

Various changes in construction and arrangement of the several parts herein shown and described may be made without departing from the spirit of my invention, as disclosed in the appended claims.

What I claim, and desire to secure by Letters Patent is:

1. In combination, a sprocket wheel, portions of which are of different pitch diameters and a chain running over said sprocket wheel and capable of being selectively operated in connection with said portions of different pitch diameters for the purpose stated.

2. In self-laying track vehicles, a toothed sprocket wheel, an endless flexible chain track running over said sprocket wheel and comprising a series of link sections, said sprocket wheel having a plurality of teeth for each link section, the bases of the teeth engaged by the links being a different distance from the center than those not engaged, for the purpose stated.

3. In a self-laying track vehicle, a toothed sprocket wheel having alternate depressions of one depth and intermediate depressions of a different depth, and an endless flexible chain track running over said wheel and comprising a series of articulated link sections, each link receiving two teeth, for the purpose stated.

4. In a self-laying track vehicle, a toothed sprocket wheel having alternate depressions of one depth and intermediate depressions of a different depth, and an endless flexible chain track running over said wheel and comprising a series of articulated link sections, each having a pin tooth to enter a depression in the sprocket wheel, said pin teeth being spaced a distance corresponding to the peripheral length of two teeth, whereby the chain may be arranged to have its pin teeth work at one time in the deep depressions and at another time in the shallow depressions.

5. The combination with a chain track tractor of means to take up wear in said track, said means comprising a toothed sprocket wheel having alternate depressions of one depth and intermediate depressions of a different depth, for the purpose stated.

In testimony whereof I have hereunto set my hand in the presence of two subscribing witnesses.

PLINY E. HOLT.

Witnesses:
R. E. MANN,
FRANK H. CHISHOLM.